United States Patent [19]

Lesch et al.

[11] Patent Number: 4,938,937

[45] Date of Patent: Jul. 3, 1990

[54] CRYSTALLINE ALUMINOPHOSPHATE COMPOSITION

[75] Inventors: David A. Lesch, Ossining; Naomi Woodard, Peekskill; Robert L. Patton, Katonah, all of N.Y.

[73] Assignee: UOP, Des Plaines, Ill.

[21] Appl. No.: 58,258

[22] Filed: Jun. 4, 1987

[51] Int. Cl.$^5$ .............................................. C01B 25/36
[52] U.S. Cl. ..................................... 423/306; 423/305
[58] Field of Search .............. 423/305, 306, 118, 122, 423/328, 329; 502/162, 164, 208, 214

[56] References Cited

U.S. PATENT DOCUMENTS

| | | | |
|---|---|---|---|
| 4,310,440 | 1/1982 | Wilson et al. | 423/305 |
| 4,440,871 | 4/1984 | Lok et al. | 502/214 |
| 4,473,663 | 9/1984 | Patton et al. | 502/208 |
| 4,554,143 | 11/1985 | Messina et al. | 423/306 |
| 4,567,029 | 1/1986 | Wilson et al. | 423/306 |
| 4,647,442 | 3/1987 | Derouane et al. | 423/329 |

OTHER PUBLICATIONS

Flanigen et al., "Aluminophosphate Molecular Sieves and the Periodic Table", 7th Int. Zeolite Conf., Tokyo, Aug. 17–22, 1986.

F. D'Yvoire, Bull. Soc. Chem., France, pp. 1762–1776 (1961).

Primary Examiner—John Doll
Assistant Examiner—R. Bruce Breneman
Attorney, Agent, or Firm—Thomas K. McBride; Eugene I. Snyder; Frank S. Molinaro

[57] ABSTRACT

A novel crystalline aluminophosphate of the molecular sieve type, denominated AlPO$_4$-34, is prepared by hydrothermal synthesis from reactive sources of aluminum and phosphorus and an organic templating agent.

19 Claims, No Drawings

CRYSTALLINE ALUMINOPHOSPHATE COMPOSITION

FIELD OF THE INVENTION

The present invention relates in general to crystalline aluminophosphate compositions, and more particularly to a novel crystalline aluminophosphate of the molecular sieve type. The present compositions represent a distinct species of the family disclosed in U.S. Pat. No. 4,310,440.

BACKGROUND OF THE INVENTION

Microporous crystalline aluminophosphate compositions having open framework structures formed of $AlO_2$ and $PO_2$ tetrahedral units joined by the sharing of the corner oxygen atoms and characterized by having pore openings of uniform dimensions have heretofore been disclosed in a number of publications, notably the specification of U.S. Pat. No. 4,310,440 issued July 7, 1980 to S. T. Wilson, et al. The Wilson, et al., aluminophosphates constitute a generic class of non-zeolite molecular sieve materials which are capable of undergoing complete and reversible dehydration while retaining the same essential framework topology in both the anhydrous and hydrated state. By the term "essential framework topology" or "essential framework structure" as used in the aforesaid patent, and also in the present specification and claims,, is meant the spatial arrangement of the primary Al—O and P—O bond linkages. Other microporous aluminophosphates which undergo structure rearrangements, either reversibly or irreversibly, upon partial or complete dehydration are also known, for example the minerals variscite and metavariscite and certain of the synthetic metastable aluminophosphates reported by F. D'Yvoire [Bull. Soc. Chim. France, 1762 (1961)]. Another class of synthetic crystalline compositions which contain framework tetrahedral metal oxides of manganese, magnesium, cobalt and/or zinc in addition the $AlO_2$ and $PO_2$ tetrahedra are disclosed in commonly assigned U.S. Pat. Ser. No. 4,567,029, issued on Jan. 28, 1986. Yet another class of synthetic crystalline compositions which contain framework tetrahedral silicon dioxide in addition to the tetrahedral $AlO_2$ and $PO_2$ is disclosed in U.S. Pat. No. 4,440,871, issued on Apr. 3, 1984. U.S. Pat. No. 4,473,663, issued Sep. 25, 1984, discloses a distinct species, AlPO$_4$-33, of the family disclosed in U.S. Pat. No. 4,310,440.

SUMMARY OF THE INVENTION

The present invention pertains to a novel microporous crystalline aluminophosphate composition, denominated AlPO$_4$-34 and the methods for its preparation. AlPO$_4$-34 has an essential framework structure whose chemical composition, expressed in terms of mole ratios of oxides, is:

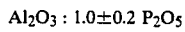

and exhibits an X-ray powder diffraction pattern, in its as synthesized form, which contains at least the d-spacings set forth in Table I set forth hereinafter.

AlPO$_4$-34 can be prepared by hydrothermal crystallization from a reaction mixture prepared by combining reactive sources of phosphorus and aluminum with water and at least one organic structure directing agent ("templating agent" or "template") which can include organic amines and quaternary ammonium compounds, and most preferably tetraethylammonium hydroxide. In the as-synthesized form wherein the AlPO$_4$-34 prepared by hydrothermal crystallization has not been subjected to a post-synthesis treatment effective in removing the structure directing agent, the structure directing agent is contained within the framework structure of the aluminophosphate in amounts which vary per mole of Al$_2$O$_3$. The structure directing agent is readily removed by calcination and does not appear to be an essential constituent of the product AlPO$_4$-34.

DETAILED DESCRIPTION OF THE INVENTION

The novel microporous aluminophosphate of the present invention can be produced by hydrothermal crystallization from a reaction mixture containing reactive sources of phosphorus and aluminum and an organic templating agent, preferably tetraethylammonium hydroxide. The preparative process typically comprises forming a reaction mixture which in terms of molar ratios of oxides is

and contains at least one organic templating agent in an effective amount which forms AlPO$_4$-34 product. Representative of the amount of organic template employed herein is an amount between about 1.0 and about 12.0 moles of organic templating agent per mole of Al$_2$O$_3$. The reaction mixture is placed in a reaction vessel inert toward the reaction mixture and heated at a temperature of at least about 70° C., preferably between 75° C. and 200° C., until crystallized, usually a period of from 2 hours to 3 weeks or more. The solid crystalline reaction product is then recovered by any convenient method, such as filtration or centrifugation, washed with water and dried in air at a temperature between ambient and about 110° C.

In a preferred crystallization method, a solution is prepared from aqueous solutions of phosphoric acid, monoaluminum phosphate, and an organic templating agent and is then, with or without heating (e.g., at about 100° C. for a few minutes to about 20 days) combined with additional alumina and phosphorus source, e.g., AlPO$_4$-5, and is then heated to about 100° C. for from 1 day to 2 weeks. The preferred ratio of inorganic oxides in the initial solution is:

The preferred initial solution contains between 8 and 12 moles of organic templating agent per mole of Al$_2$O$_3$.

The AlPO$_4$-34 material of the present invention can alternately be crystallized from a gel formed from an organic templating agent and appropriate phosphorus and alumina sources such as phosphoric acid and a pseudo-boehmite hydrated aluminum oxide, preferably seeded with AlPO$_4$-34, and digested via conditions typical of those detailed in U.S. Pat. No. 4,310,440.

Not all templating agents suitably employed in preparation of all aluminophosphates are believed to be generally suitable for the preparation of AlPO$_4$-34. The use of tetraethylammonium hydroxide has been found to act as an acceptable templating agent for use in the preparation of AlPO$_4$-34.

The low concentration of aluminum used in the initial mixture of the preferred crystallization method results in a solution, as opposed to the gels or suspensions typically employed in the prior art. When heated to an appropriate temperature, about 100° C. for AlPO$_4$-34, these solutions yield small amounts of aluminophosphates. This solution-synthesis method is quite general and can, with the appropriate choice of organic templating agent and digestion conditions, be used to prepare many of the aluminophosphate compositions of the prior art. Solutions of this type can also be used to convert, or recrystallize, an aluminophosphate of one structure into another structure. In the preferred crystallization method of the present application, AlPO$_4$-5 is quantitatively converted to AlPO$_4$-34.

The as-synthesized AlPO$_4$-34 compositions are isolated after synthesis and advantageously washed with water. The as synthesized AlPO$_4$-34 compositions may contain the organic templating agent within the intracrystalline pore system. The form of the organic templating agent may be an occluded molecular species (or may be present as a charge balancing cation). In general, it is desirable to remove the organic templating agent by calcination at a temperature sufficient to remove substantially all of the organic templating agent. The calcination temperature is generally between about 300° C. and about 700° C., i.e., whereby the organic templating agent is removed by thermal degradation.

The template containing as synthesized form of AlPO$_4$-34 of the present invention has an essential framework structure whose chemical composition expressed in terms of mole ratios of oxides is:

$Al_2O_3 : 1.0 \pm 0.2 \; P_2O_5$ and has a characteristic X-ray powder diffraction pattern which contains at least the d-spacings set forth in Table I below:

TABLE I

| 2θ | d, (Å) | Relative Intensity |
|---|---|---|
| 9.6–9.8 | 9.24–9.06 | VS |
| 13.0–13.1 | 6.83–6.74 | VW–W |
| 14.1–14.2 | 6.28–6.22 | VW–W |
| 16.0–16.2 | 5.55–5.47 | VW–M |
| 17.9–18.3 | 4.94–4.84 | VW–W |
| 20.8–21.0 | 4.34–4.23 | M |
| 25.1–25.6 | 3.54–3.48 | VW–W |
| 30.8–31.0 | 2.903–2.887 | W–M |

In some of the X-ray patterns reported, the relative intensities of the d-spacings are indicated by the notations VS, S, M, W and VW which represent Very Strong, Strong, Medium, Weak and Very Weak, respectively.

The above X-ray patterns and all other X-ray patterns appearing hereinafter were obtained by use of either a standard X-ray powder diffraction technique or by use of computer based techniques using a Siemens D-500 X-ray powder diffractometer, available from Siemens Corporation, Cherry Hill, N.J. When the standard X-ray technique is employed the radiation source is a high intensity, copper target, X-ray tube operated at 40 Kv and 49 ma. The diffraction pattern from the copper K-alpha radiation and graphite monochromator were recorded by an X-ray spectrometer scintillation counter, pulse height analyzer and strip chart recorder.

Flat compressed powder samples are scanned at 2 degrees (2 theta) per minute, using a two second time constant. Interplanar spacings (d) in Angstrom units are obtained from the position of the diffraction peaks expressed as 2Θ (theta) as observed on the strip chart where theta is the Bragg angle. Intensities were determined from the heights of diffraction peaks after subtracting background, "$I_o$" being the intensity of the strongest line or peak, and "I" being the intensity of each of the other peaks.

As will be understood by those skilled in the art the determination of the parameter 2 theta, irrespective of the technique employed, is subject to both human and mechanical error, which in combination, can impose an uncertainty of about 0.4° on each reported value of 2 theta. This uncertainty is of course, also manifested in the reported value of the d-spacings, which are calculated from the 2 theta values. This imprecision is general throughout the art and is not sufficient to preclude the differentiation of the present crystalline materials from the compositions of the prior art.

As-synthesized crystalline aluminophosphates in the form of AlPO$_4$-34 for which x-ray powder diffraction data have been obtained exhibit patterns within the generalized pattern of Table II below:

TABLE II

| 2θ | d, (Å) | Relative Intensity |
|---|---|---|
| 9.6–9.8 | 9.24–9.06 | 100 |
| 13.0–13.1 | 6.83–6.74 | 4–17 |
| 14.1–14.2 | 6.28–6.22 | 8–15 |
| 15.5–15.8 | 5.70–5.65 | 5–8 |
| 16.0–16.2 | 5.55–5.47 | 10–23 |
| 16.6–16.9 | 5.34–5.25 | 0–7 |
| 17.9–18.3 | 4.94–4.84 | 0–17 |
| 19.1–19.2 | 4.64–4.63 | 0–4 |
| 20.8–21.0 | 4.34–4.23 | 20–48 |
| 22.1–22.2 | 4.02–4.00 | 0–4 |
| 22.6–22.7 | 3.94–3.92 | 0–3 |
| 23.1–23.3 | 3.85–3.81 | 0–4 |
| 25.1–25.6 | 3.54–3.48 | 8–16 |
| 26.1–26.3 | 3.41–3.38 | 0–13 |
| 28.3–28.5 | 3.16–3.14 | 0–3 |
| 30.2–30.5 | 2.959–2.935 | 0–9 |
| 30.8–31.0 | 2.903–2.887 | 14–22 |
| 32.1–32.5 | 2.785–2.753 | 0–4 |
| 33.6–33.9 | 2.669–2.647 | 0–3 |
| 34.9–35.1 | 2.571–2.560 | 0–4 |
| 36.3–36.5 | 2.477–2.465 | 0–2 |
| 39.9–40.3 | 2.261–2.239 | 0–3 |
| 43.2–43.3 | 2.094–2.087 | 0–3 |
| 49.5–49.9 | 1.842–1.826 | 0–3 |
| 51.1–51.3 | 1.789–1.780 | 0–3 |

When the as-synthesized AlPO$_4$-34 compositions are calcined, i.e., heated at a temperature sufficiently high (typically between about 300° C. and about 700° C.) or otherwise treated, such as by chemical oxidation, to remove essentially all of the organic templating agent present in the intracrystalline pore system and are allowed to rehydrate in ambient air, the composition has an x-ray powder diffraction pattern which contains at least the d-spacings set forth in Table III below:

TABLE III

| 2θ | d (Å) | Relative Intensity |
|---|---|---|
| 9.7 | 9.10 | VS |
| 12.9 | 6.88 | W |
| 19.5 | 4.55 | M |
| 24.4 | 3.65 | W |
| 29.3 | 3.05 | W |
| 31.0 | 2.883 | W |

When the as synthesized or calcined and rehydrated AlPO$_4$-34 compositions are heated in the absence of $H_2O$ (e.g. under dry nitrogen) at a temperature sufficiently high to remove the organic templating agent and/or the $H_2O$ present in the intracrystalline pore system, the composition has an x-ray powder diffraction pattern which contains at least the d-spacings set forth in Table IV below:

TABLE IV

| $2\theta$ | d (Å) | Relative Intensity |
|---|---|---|
| 9.4 | 9.37 | VS |
| 12.9 | 6.87 | W-M |
| 16.0 | 5.53 | W-M |
| 17.8 | 4.97 | W-M |
| 20.7 | 4.30 | M-S |
| 25.0 | 3.56 | W-M |
| 30.7 | 2.910 | W-S |

AlPO$_4$-34 exhibits surface characteristics which make it useful as a catalyst or catalyst support in various hydrocarbon conversion and oxidative combustion processes. AlPO$_4$-34 can be associated with catalytically active metals, e.g., by framework substitution, by impregnation, doping and the like, by methods traditionally used in the art for the fabrication of catalyst compositions.

Among the hydrocarbon conversion reactions that can be catalyzed by AlPO$_4$-34 composition are cracking, hydrocracking, alkylation for both the aromatic and isoparaffin types, isomerization including xylene isomerization, polymerization, reforming, hydrogenation, dehydrogenation, transalkylation, dealkylation, hydrodecyclization and dehydrocyclization.

The results further show that AlPO$_4$-34 has a pore size of at least 4.3 Angstroms but less than 5.0 Angstroms which makes AlPO$_4$-34 suitable for use as a molecular sieve for the separation of molecular species, and for carrying out shape-selective catalysis.

The following examples are provided to illustrate the invention and are not to be construed as limiting thereof:

ABBREVIATIONS USED

In the following examples the AlPO$_4$-34 compositions were prepared using numerous reagents. The reagents employed and their abbreviations, if any, along with other abbreviations used are as follows:

(a) LOI: Loss On Ignition;
(b) H$_3$PO$_4$: 85 weight percent aqueous phosphoric acid;
(c) TEAOH: Aqueous solution of tetraethylammonium hydroxide; and
(d) TEFLON (polytetrafluoroethylene): is a trademark of E. I. du Pont de Nemours & Co, Wilmington, DE, U.S.A.

EXAMPLE 1

(a) A reaction mixture was prepared by combining 51.8 grams of 85 wt. % orthophosphoric acid (H$_3$PO$_4$) and 130.8 grams of aqueous monoaluminum phosphate (Al(H$_2$PO$_4$)$_3$), 7.8 wt. % Al$_2$O$_3$, 32.8 wt. % P$_2$O$_5$), to which was added 368 grams of 39.3 wt. % aqueous tetraethylammonium hydroxide (TEAOH) and stirred until homogeneous. The composition of the final reaction mixture, in terms of molar oxide ratios was:

10.0 TEAOH : Al$_2$O$_3$ : 5.3 P$_2$O$_5$ : 177 H$_2$O.

A portion of the reaction mixture (274.6 grams) was sealed in a Teflon jar and was heated in an oven at 100° C. for 144 hours. The liquid was decanted and the remaining solids were washed with H$_2$O and dried in ambient air. The 4.6 grams of solid obtained were analyzed by x-ray powder diffraction and found to be AlPO$_4$-18, as described in Example 46 of U.S. Pat. No. 4,310,440. The decanted liquid was sealed in a Teflon jar and heated in an oven at 100° C. for 269 hours. 5.0 grams of calcined AlPO$_4$-5 was added to the hot reaction mixture, mixed until homogeneous, and heated at 100° C. for 71 hours to produce solids of AlPO$_4$-34. The AlPO$_4$-34 product was recovered by centrifugation, washed with H$_2$O, and dried in air at ambient temperature.

The calcined AlPO$_4$-5 employed above was prepared in a manner similar to that disclosed in Examples 1-26 of U.S. Pat. No. 4,310,440 using 85% orthophosphoric acid, hydrated alumina (pseudo boehmite phase), and tetraethylammonium hydroxide and tripropylamine as templates. Crystallization was effected in a stirred stainless steel autoclave at 150° C. and autogenous pressure. X-ray powder diffraction of the dried product revealed AlPO$_4$-5 as the sole product. The as synthesized AlPO$_4$-5 was calcined in air at 600° C. for 2.5 hours then was rehydrated at ambient conditions.

A portion of the 4.6 grams of dried AlPO$_4$-34 product was analyzed and the following chemical analysis obtained:

| | Weight Percent |
|---|---|
| Carbon | 10.8 |
| Nitrogen | 1.4 |
| Al$_2$O$_3$ | 28.5 |
| P$_2$O$_5$ | 46.7 |
| LOI | 25.5 |

The above chemical analysis corresponds to a product composition in molar oxide ratios of:

0.40 TEAOH : Al$_2$O$_3$ : 1.18 P$_2$O$_5$ : 1.77 H$_2$O which corresponds to an empirical chemical composition (anhydrous basis) of:

0.092 TEAOH : (Al$_{0.46}$P$_{0.54}$)O$_2$

The X-ray powder diffraction pattern of the AlPO$_4$-34 product was characterized by the data in the following table:

TABLE A

| $2\theta$ | d (Å) | 100I/Io |
|---|---|---|
| 9.6 | 9.24 | 100 |
| 13.0 | 6.80 | 12 |
| 14.1 | 6.27 | 11 |
| 15.6 | 5.69 | 7 |
| 16.2 | 5.48 | 23 |
| 16.8 | 5.27 | 3 |
| 17.9 | 4.94 | 14 |
| 19.1 | 4.64 | 3 |
| 20.9 | 4.25 | 41 |
| 22.1 | 4.02 | 4 |
| 22.6 | 3.94 | 3 |
| 23.3 | 3.81 | 3 |
| 25.1 | 3.54 | 15 |
| 26.3 | 3.39 | 9 |
| 28.3 | 3.16 | 3 |
| 30.2 | 2.959 | 4 |
| 30.9 | 2.896 | 22 |
| 32.5 | 2.753 | 3 |
| 33.9 | 2.647 | 3 |
| 34.9 | 2.570 | 3 |

TABLE A-continued

| 2 θ | d (Å) | 100I/Io |
|---|---|---|
| 36.5 | 2.465 | 2 |
| 39.9 | 2.258 | 2 |
| 43.3 | 2.090 | 2 |
| 49.5 | 1.842 | 2 |
| 51.3 | 1.782 | 3 |

(b) A portion of the AlPO$_4$-34 product obtained in part (a) was calcined in air by heating to 600° C. at 31° C./hour and holding at 600° C. for 4.5 hours. After cooling to room temperature and rehydrating in ambient air, the calcined solid had an X-ray powder diffraction pattern characterized by the data in the following table:

TABLE B

| 2 θ | d (Å) | 100I/Io |
|---|---|---|
| 9.7 | 9.10 | 100 |
| 10.2 | 8.65 | 34 |
| 12.1 | 7.30 | 3 |
| 12.9 | 6.88 | 19 |
| 15.5 | 5.73 | 4 |
| 17.2 | 5.15 | 4 |
| 19.5 | 4.55 | 29 |
| 19.8 | 4.48 | 26 |
| 20.7 | 4.30 | 23 |
| 21.5 | 4.13 | 5 |
| 22.8 | 3.91 | 7 |
| 24.4 | 3.65 | 14 |
| 24.9 | 3.58 | 7 |
| 25.9 | 3.44 | 5 |
| 27.0 | 3.30 | 5 |
| 27.4 | 3.25 | 3 |
| 28.2 | 3.17 | 8 |
| 29.3 | 3.05 | 17 |
| 31.0 | 2.883 | 15 |
| 32.0 | 2.799 | 10 |
| 33.0 | 2.714 | 7 |
| 38.4 | 2.347 | 3 |
| 40.1 | 2.250 | 3 |
| 43.1 | 2.097 | 2 |
| 49.6 | 1.838 | 3 |
| 53.0 | 1.726 | 3 |

A portion of the calcined AlPO$_4$-34 was placed in a standard McBain-Bakr gravimetric adsorption apparatus and activated under vacuum at 350° C. overnight. Subsequent adsorption data were measured as listed in Table 2 below. Vacuum activations at 350° C. were performed between all adsorbate changes.

TABLE 2

| Adsorbate Molecule | Kinetic Diameter, (Å) | Pressure (torr) | Temp. (°C.) | Wt. % Adsorbed |
|---|---|---|---|---|
| O$_2$ | 3.46 | 106 | −183 | 21.8 |
| O$_2$ | 3.46 | 705 | −183 | 31.7 |
| isobutane | 5.0 | 704 | 23 | 0.9 |
| n-hexane | 4.3 | 44 | 22 | 9.7 |
| H$_2$O | 2.65 | 4.6 | 22 | 24.9 |
| H$_2$O | 2.65 | 19 | 23 | 37.0 |

These adsorption data indicate that the AlPO$_4$-34 product is a molecular sieve with a pore size of at least about 4.3 Angstroms but less than about 5.0 Angstroms.

EXAMPLE 2

(a) A reaction mixture was prepared by combining 51.8 grams of 85 wt. % orthophosphoric acid (H$_3$PO$_4$) and 130.8 grams of aqueous monoaluminum phosphate (Al(H$_2$PO$_4$)$_3$), 7.8 wt. % Al$_2$O$_3$, 32.8 wt. % P$_2$O$_5$), to which was added 368 grams of 39.3 wt. % tetraethylammonium hydroxide (TEAOH) and stirred until homogeneous. The composition of the final reaction mixture, in terms of molar oxide ratios was:

10.0 TEAOH : Al$_2$O$_3$ : 5.3 P$_2$O$_5$ : 177 H$_2$O

A portion of the reaction mixture (275.5 grams) was sealed in a Teflon jar and was heated in an oven at 100° C. for 144 hours. The liquid was decanted and the remaining solids were washed with H$_2$O and dried in ambient air. The 5.8 grams of solid obtained were analyzed by x-ray powder diffraction and found to be AlPO$_4$-18, as described in Example 46 of U.S. Pat. No. 4,310,440. The decanted liquid was sealed in a Teflon jar and heated in an oven at 100° C. for 45 hours. 5.0 grams of calcined AlPO$_4$-5 (prepared as described in Example 1) was added to the hot reaction mixture, mixed until homogeneous, and heated at 100° C. for 93 hours. The AlPO$_4$-34 product was recovered by centrifugation, washed with H$_2$O, and dried in air at ambient temperature.

A portion of the 6.5 grams of dried AlPO$_4$-34 product was analyzed and the following chemical analysis obtained:

| | Weight Percent |
|---|---|
| Carbon | 11.0 |
| Nitrogen | 1.5 |
| Al$_2$O$_3$ | 29.85 |
| P$_2$O$_5$ | 48.3 |
| LOI | 21.9 |

The above chemical analysis corresponds to a product composition in molar oxide ratios of:

0.39 TEAOH : Al$_2$O$_3$ : 1.16 P$_2$O$_5$ : 0.96 H$_2$O which corresponds to an empirical chemical composition (anhydrous basis) of:

0.090 TEAOH : (Al$_{0.46}$P$_{0.54}$)O$_2$

The X-ray powder diffraction pattern of the as-synthesized AlPO$_4$-34 product was characterized by the data in Table C.

TABLE C

| 2 θ | d (Å) | 100I/Io |
|---|---|---|
| 9.6 | 9.19 | 100 |
| 13.1 | 6.77 | 10 |
| 14.1 | 6.26 | 10 |
| 15.5 | 5.70 | 6 |
| 16.2 | 5.47 | 23 |
| 16.9 | 5.25 | 2 |
| 18.0 | 4.93 | 14 |
| 19.2 | 4.63 | 4 |
| 20.9 | 4.25 | 40 |
| 22.2 | 4.00 | 4 |
| 22.7 | 3.92 | 3 |
| 23.3 | 3.81 | 2 |
| 25.2 | 3.54 | 16 |
| 26.3 | 3.38 | 8 |
| 28.4 | 3.14 | 3 |
| 30.5 | 2.935 | 4 |
| 30.9 | 2.893 | 22 |
| 32.1 | 2.785 | 2 |
| 33.8 | 2.653 | 2 |
| 35.0 | 2.566 | 3 |
| 36.3 | 2.475 | 2 |
| 40.1 | 2.248 | 2 |
| 43.3 | 2.089 | 2 |
| 49.5 | 1.842 | 2 |

TABLE C-continued

| 2θ | d (Å) | 100I/Io |
|---|---|---|
| 51.2 | 1.784 | 3 |

A portion of the as synthesized AlPO$_4$-34 product was subjected to a series of in-situ thermal treatments in a high temperature x-ray powder diffraction apparatus. The diffraction apparatus was adapted for control of sample temperature and environment while on the sample stage. The room temperature scan had an x-ray powder diffraction pattern essentially identical to that in Table C. The solids were heated to 500° C. at 20° C./minute under N$_2$ flow and held at 500° C. for 30 minutes then were cooled to room temperature under N$_2$. The x-ray powder diffraction pattern of the resulting solid at room temperature under N$_2$ is listed in Table D. After rehydration by exposure to ambient air for 2 hours, this solid gave an x-ray diffraction pattern essentially identical to the data in Table B. Subsequent dehydration by heating at 100° C. for one hour under N$_2$ gave a solid which had an x-ray diffraction pattern essentially identical to the data in Table D.

TABLE D

| 2θ | d (Å) | 100I/Io |
|---|---|---|
| 9.4 | 9.37 | 100 |
| 12.9 | 6.87 | 34 |
| 14.0 | 6.34 | 5 |
| 16.0 | 5.53 | 25 |
| 17.8 | 4.97 | 27 |
| 19.1 | 4.66 | 4 |
| 20.7 | 4.30 | 87 |
| 22.1 | 4.02 | 7 |
| 22.5 | 3.96 | 5 |
| 23.1 | 3.85 | 10 |
| 23.9 | 3.73 | 2 |
| 25.0 | 3.56 | 40 |
| 26.0 | 3.43 | 33 |
| 27.7 | 3.22 | 7 |
| 28.2 | 3.16 | 5 |
| 29.7 | 3.01 | 5 |
| 30.7 | 2.910 | 74 |
| 31.2 | 2.871 | 39 |
| 32.5 | 2.759 | 4 |
| 33.5 | 2.673 | 6 |
| 34.6 | 2.590 | 16 |
| 36.1 | 2.485 | 13 |
| 38.8 | 2.321 | 3 |
| 39.7 | 2.270 | 62 |

EXAMPLE 3

(a) A reaction mixture was prepared by combining 22.9 grams of 85 wt. % orthophosphoric acid (H$_3$PO$_4$) and 65.4 grams of aqueous monoaluminum phosphate (Al(H$_2$PO$_4$)$_3$, 7.7 wt. % Al$_2$O$_3$, 33.0 wt. % P$_2$O$_5$), to which was added 187 grams of 39.9 wt. % aqueous tetraethylammonium hydroxide (TEAOH) and stirred until homogeneous. 5.0 grams of calcined AlPO$_4$-5 (prepared as described in Example 1) was added and shaken until homogeneous. The composition of the final reaction mixture, in terms of molar oxide ratios and excluding the AlPO$_4$-5 solids was:

10.0 TEAOH : Al$_2$O$_3$ : 5.0 P$_2$O$_5$ : 179 H$_2$O

The reaction mixture was sealed in a Teflon jar and was heated in an oven at 100° C. for 242 hours. The solids were recovered by centrifugation, washed with H$_2$O, and dried in air at ambient temperature.

The 10.5 grams of dried product had an x-ray powder diffraction pattern which indicated AlPO$_4$-34 with a small amount of AlPO$_4$-5. The AlPO$_4$-34 phase had an x-ray powder diffraction pattern characterized by the data in Table E.

TABLE E

| 2θ | d (Å) | 100I/Io |
|---|---|---|
| 9.6 | 9.23 | 100 |
| 13.0 | 6.83 | 10 |
| 14.1 | 6.28 | 11 |
| 16.1 | 5.51 | 18 |
| 16.7 | 5.32 | 5 |
| 18.1 | 4.91 | 14 |
| 20.9 | 4.25 | 48 |
| 23.1 | 3.85 | 4 |
| 25.2 | 3.53 | 11 |
| 26.1 | 3.41 | 11 |
| 28.4 | 3.14 | 3 |
| 30.3 | 2.954 | 9 |
| 30.9 | 2.898 | 16 |
| 43.2 | 2.093 | 3 |

EXAMPLE 4

(a) A reaction mixture was prepared by combining 10.6 grams of 85 wt. % orthophosphoric acid (H$_3$PO$_4$) and 66.2 grams of aqueous monoaluminum phosphate (Al(H$_2$PO$_4$)$_3$, 7.7 wt. % Al$_2$O$_3$, 33.0 wt. % P$_2$O$_5$) which was added 149.5 grams of 39.3 wt. % aqueous tetraethylammonium hydroxide (TEAOH) and stirred until homogeneous. To this mixture was added 4.5 grams of calcined AlPO$_4$-5 (prepared as described in Example 1) and was shaken until homogeneous. The composition of the final reaction mixture, in terms of molar oxide ratios and excluding the AlPO$_4$-5 solids was:

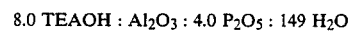

8.0 TEAOH : Al$_2$O$_3$ : 4.0 P$_2$O$_5$ : 149 H$_2$O

The reaction mixture was sealed in a Teflon jar and was heated in an oven at 100° C. for 192 hours. The solids were recovered by centrifugation, washed with H$_2$O, and dried in air at ambient temperature.

The 9.6 grams of dried product had an x-ray powder diffraction pattern which indicated AlPO$_4$-34 with a small amount of AlPO$_4$-5. The AlPO$_4$-34 phase had an x-ray powder diffraction pattern characterized by the data in Table F.

TABLE F

| 2θ | d (Å) | 100I/Io |
|---|---|---|
| 9.7 | 9.15 | 100 |
| 13.1 | 6.75 | 8 |
| 14.2 | 6.24 | 11 |
| 16.1 | 5.50 | 15 |
| 18.3 | 4.84 | 16 |
| 21.0 | 4.23 | 35 |
| 23.3 | 3.81 | 3 |
| 25.5 | 3.49 | 11 |
| 26.2 | 3.40 | 10 |
| 28.5 | 3.14 | 2 |
| 30.4 | 2.945 | 7 |
| 30.9 | 2.889 | 16 |
| 32.2 | 2.783 | 3 |
| 33.6 | 2.669 | 2 |
| 34.9 | 2.571 | 3 |
| 40.3 | 2.239 | 3 |
| 49.7 | 1.834 | 2 |
| 51.1 | 1.789 | 2 |

EXAMPLE 5

(a) A reaction mixture was prepared by combining 10.6 grams of 85 wt. % orthophosphoric acid (H$_3$PO$_4$) and 66.2 grams of aqueous monoaluminum phosphate (Al(H$_2$PO$_4$)$_3$, 7.7 wt. % Al$_2$O$_3$, 33.0 wt. % P$_2$O$_5$) which was added 149.5 grams of 39.3 wt. % aqueous tetraethylammonium hydroxide (TEAOH) and stirred until homogeneous. The composition of the final reaction mixture, in terms of molar oxide ratios was:

8.0 TEAOH : Al$_2$O$_3$ : 4.0 P$_2$O$_5$ : 149 H$_2$O

The reaction mixture was sealed in a Teflon jar and was heated in an oven at 100° C. for 474 hours. The solids were recovered by centrifugation, washed with H$_2$O, and dried in air at ambient temperature.

The 4.2 grams of dried product had an x-ray powder diffraction pattern which indicated AlPO$_4$-34 with a small amount of AlPO$_4$-18. The AlPO$_4$-34 phase had an x-ray powder diffraction pattern characterized by the data in Table G.

TABLE G

| 2 θ | d (Å) | 100I/Io |
|---|---|---|
| 9.6 | 9.18 | 100 |
| 13.1 | 6.74 | 5 |
| 14.1 | 6.28 | 10 |
| 16.1 | 5.51 | 14 |
| 18.3 | 4.86 | 16 |
| 20.9 | 4.25 | 26 |
| 22.1 | 4.02 | 2 |
| 22.6 | 3.93 | 3 |
| 23.1 | 3.85 | 3 |
| 25.5 | 3.50 | 11 |
| 26.2 | 3.40 | 6 |
| 28.3 | 3.15 | 2 |
| 30.9 | 2.897 | 16 |
| 32.3 | 2.773 | 4 |
| 34.9 | 2.571 | 2 |
| 40.0 | 2.252 | 2 |
| 49.9 | 1.826 | 3 |
| 51.1 | 1.786 | 2 |

EXAMPLE 6

(a) A reaction mixture was prepared by combining 21.2 grams of 85 wt. % orthophosphoric acid (H$_3$PO$_4$) and 132.4 grams of aqueous monoaluminum phosphate (Al(H$_2$PO$_4$)$_3$, 7.7 wt. % Al$_2$O$_3$, 33.0 wt. % P$_2$O$_5$), to which was added 299.0 grams of 39.3 wt. % aqueous tetraethylammonium hydroxide (TEAOH) and stirred until homogeneous. To this mixture was added 0.8 grams of AlPO$_4$-34 seed crystals (prepared in Example 5) and mixed until homogeneous. The composition of the final reaction mixture, in terms of molar oxide ratios and excluding AlPO$_4$-34 solids was:

8.0 TEAOH : Al$_2$O$_3$ : 4.0 P$_2$O$_5$ : 149 H$_2$O

A portion of the reaction mixture (222.1 grams) was sealed in a Teflon jar and was heated in an oven at 100° C. for 140 hours. The solids were recovered by centrifugation, washed with H$_2$O, and dried in air at ambient temperature.

The 3.6 grams of dried product had an x-ray powder diffraction pattern which indicated AlPO$_4$-34 with a smaller amount of an impurity phase. The AlPO$_4$-34 phase had an x-ray powder diffraction pattern characterized by the data in Table H.

TABLE H

| 2 θ | d (Å) | 100I/Io |
|---|---|---|
| 9.6 | 9.17 | 100 |
| 13.1 | 6.74 | 4 |
| 14.2 | 6.26 | 9 |
| 16.0 | 5.53 | 10 |

TABLE H-continued

| 2 θ | d (Å) | 100I/Io |
|---|---|---|
| 18.3 | 4.84 | 16 |
| 20.9 | 4.26 | 22 |
| 22.1 | 4.02 | 3 |
| 23.2 | 3.83 | 3 |
| 25.6 | 3.48 | 11 |
| 28.4 | 3.15 | 2 |
| 30.9 | 2.897 | 14 |
| 32.4 | 2.767 | 4 |
| 34.4 | 2.610 | 2 |
| 40.1 | 2.251 | 2 |

EXAMPLE 7

(a) A reaction mixture was prepared by combining 46.2 grams of 85 wt. % orthophosphoric acid (H$_3$PO$_4$) and 28.0 grams H$_2$O, to which was added 27.9 grams of a pseudo-boehmite phase (73.2 wt. % Al$_2$O$_3$) and stirred until homogeneous. 36.0 grams of H$_2$O was blended into this mixture, followed by the addition of 3.3 grams of AlPO$_4$-34 seed crystals (prepared in a manner similar to Example 2). To this mixture was added 149.5 grams of 39.3 wt. % aqueous tetraethylammonium hydroxide (TEAOH) and stirred until homogeneous. The composition of the final reaction mixture in terms of molar oxide ratios and excluding AlPO$_4$-34 solids was:

2.0 TEAOH : Al$_2$O$_3$ : P$_2$O$_5$ : 50 H$_2$O

A portion of the reaction mixture (167.6 grams) was sealed in a Teflon jar and was heated in an oven at 100° C. for 288 hours. The solids were recovered by centrifugation, washed with H$_2$O, and dried in air at ambient temperature.

The 4.9 grams of dried product had an x-ray powder diffraction pattern which indicated AlPO$_4$-34 with a smaller amount of an impurity phase. The AlPO$_4$-34 phase had an x-ray powder diffraction pattern characterized by the data in Table J.

TABLE J

| 2 θ | d (Å) | 100I/Io |
|---|---|---|
| 9.8 | 9.06 | 100 |
| 13.0 | 6.79 | 17 |
| 14.2 | 6.22 | 15 |
| 16.1 | 5.50 | 12 |
| 21.0 | 4.24 | 28 |
| 25.6 | 3.48 | 9 |
| 30.3 | 2.948 | 6 |
| 31.0 | 2.887 | 21 |
| 35.1 | 2.560 | 4 |
| 36.3 | 2.477 | 2 |

What is claimed is:

1. Microporous crystalline aluminophosphates having a framework structure whose chemical composition expressed in terms of mole ratios of oxides is Al$_2$O$_3$ : 1.0±0.2 P$_2$O$_5$ and having a characteristic X-ray powder diffraction pattern which contains at least the d-spacings set forth in Table I

TABLE I

| 2θ | d, (Å) | Relative Intensity |
|---|---|---|
| 9.6–9.8 | 9.24–9.06 | VS |
| 13.0–13.1 | 6.83–6.74 | VW-W |
| 14.1–14.2 | 6.28–6.22 | VW-W |
| 16.0–16.2 | 5.55–5.47 | VW-M |

TABLE I-continued

| 2θ | d, (Å) | Relative Intensity |
|---|---|---|
| 17.9–18.3 | 4.94–4.84 | VW–W |
| 20.8–21.0 | 4.34–4.23 | M |
| 25.1–25.6 | 3.54–3.48 | VW–W |
| 30.8–31.0 | 2.903–2.887 | W–M | where the notations VS, M, W and VW represent Very Strong, Medium, Weak, and Very Weak, respectively.

2. Microporous crystalline aluminophosphate composition according to claim 1 and having a characteristic X-ray powder diffraction pattern containing at least the d-spacings as set forth in Table II

TABLE II

| 2θ | d, (Å) | Relative Intensity |
|---|---|---|
| 9.6–9.8 | 9.24–9.06 | 100 |
| 13.0–13.1 | 6.83–6.74 | 4–17 |
| 14.1–14.2 | 6.28–6.22 | 8–15 |
| 15.5–15.8 | 5.70–5.65 | 5–8 |
| 16.0–16.2 | 5.55–5.47 | 10–23 |
| 16.6–16.9 | 5.34–5.25 | 0–7 |
| 17.9–18.3 | 4.94–4.84 | 0–17 |
| 19.1–19.2 | 4.64–4.63 | 0–4 |
| 20.8–21.0 | 4.34–4.23 | 20–48 |
| 22.1–22.2 | 4.02–4.00 | 0–4 |
| 22.6–22.7 | 3.94–3.92 | 0–3 |
| 23.1–23.3 | 3.85–3.81 | 0–4 |
| 25.1–25.6 | 3.54–3.48 | 8–16 |
| 26.1–26.3 | 3.41–3.38 | 0–13 |
| 28.3–28.5 | 3.16–3.14 | 0–3 |
| 30.2–30.5 | 2.959–2.935 | 0–9 |
| 30.8–31.0 | 2.903–2.887 | 14–22 |
| 32.1–32.5 | 2.785–2.753 | 0–4 |
| 33.6–33.9 | 2.669–2.647 | 0–3 |
| 34.9–35.1 | 2.571–2.560 | 0–4 |
| 36.3–36.5 | 2.477–2.465 | 0–2 |
| 39.9–40.3 | 2.261–2.239 | 0–3 |
| 43.2–43.3 | 2.094–2.087 | 0–3 |
| 49.5–49.9 | 1.842–1.826 | 0–3 |
| 51.1–51.3 | 1.789–1.780 | 0–3. |

3. A microporous crystalline aluminophosphate composition prepared by calcining a composition of claim 1.

4. Microporous crystalline aluminophosphate composition which results from the calcination of the composition of claim 1 at a temperature of at least 300° C.

5. Microporous crystalline aluminophosphate composition having a framework structure whose chemical composition expressed in terms of mole ratios of oxides is $Al_2O_3 : 1.0 \pm 0.2\ P_2O_5$ and having a characteristic X-ray powder diffraction pattern containing at least the d-spacings as set forth in Table III

TABLE III

| 2θ | d (Å) | Relative Intensity |
|---|---|---|
| 9.7 | 9.10 | VS |
| 12.9 | 6.88 | W |
| 19.5 | 4.55 | M |
| 24.4 | 3.65 | W |
| 29.3 | 3.05 | W |
| 31.0 | 2.883 | W | where the notations VS, M, W and VW represent Very Strong, Medium, Weak and Very Weak, respectively.

6. Microporous crystalline aluminophosphate composition having a framework structure whose chemical composition expressed in terms of mole ratios of oxides is $Al_2O_3 : 1.0 \pm 0.2\ P_2O_5$ and having a characteristic X-ray powder diffraction pattern containing at least the d-spacing as set forth in Table IV

TABLE IV

| 2θ | d (Å) | Relative Intensity |
|---|---|---|
| 9.4 | 9.37 | VS |
| 12.9 | 6.87 | W–M |
| 16.0 | 5.53 | W–M |
| 17.8 | 4.97 | W–M |
| 20.7 | 4.30 | M–S |
| 25.0 | 3.56 | W–M |
| 30.7 | 2.910 | W–S | where the notations VS, M, W and VW represent Very Strong, Medium, Weak and Very Weak, respectively.

7. Process for preparing a microporous crystalline aluminophosphate composition having framework structures formed of $AlO_2$ and $PO_2$ units whose chemical composition expressed in terms of mole ratios of oxides is $Al_2O_3 : 1.0 \pm 0.2\ P_2O_5$ and having a characteristic X-ray powder diffraction pattern containing at least the d-spacings as set forth in Tables I

TABLE I

| 2θ | d, (Å) | Relative Intensity |
|---|---|---|
| 9.6–9.8 | 9.24–9.06 | VS |
| 13.0–13.1 | 6.83–6.74 | VW–W |
| 14.1–14.2 | 6.28–6.22 | VW–W |
| 16.0–16.2 | 5.55–5.47 | VW–M |
| 17.9–18.3 | 4.94–4.84 | VW–W |
| 20.8–21.0 | 4.34–4.23 | M |
| 25.1–25.6 | 3.54–3.48 | VW–W |
| 30.8–31.0 | 2.903–2.887 | W–M | where the notations VS, M, W and VW represent Very Strong, Medium, Weak and Very Weak, respectively, which process comprises, using an AlPO$_4$-34 seed and forming a reaction mixture having a composition expressed in terms of mole ratios of oxides of $Al_2O_3 : 1-6\ P_2O_5 : 7-300\ H_2O$ and containing from about 2 to about 12 moles of at least one organic templating agent, and heating the reaction mixture thus formed at a temperature of at least about 75° C. to about 200° C. under autogenous pressure until crystals of said aluminophosphate are formed.

8. Process for preparing a microporous crystalline aluminophosphate composition having framework structures formed of $AlO_2$ and $PO_2$ units whose chemical composition expressed in terms of mole ratios of oxides is $Al_2O_3 : 1.0 \pm 0.2\ P_2O_5$ and having a characteristic X-ray powder diffraction pattern which contains at least the d-spacings set forth in the following Table I

TABLE I

| 2θ | d, (Å) | Relative Intensity |
|---|---|---|
| 9.6–9.8 | 9.24–9.06 | VS |
| 13.0–13.1 | 6.83–6.74 | VW–W |
| 14.1–14.2 | 6.28–6.22 | VW–W |
| 16.0–16.2 | 5.55–5.47 | VW–M |
| 17.9–18.3 | 4.94–4.84 | VW–W |
| 20.8–21.0 | 4.34–4.23 | M |
| 25.1–25.6 | 3.54–3.48 | VW–W |
| 30.8–31.0 | 2.903–2.887 | W–M | where the notations VS, M, W and VW represent Very Strong, Medium, Weak and Very Weak, respectively, which process comprises forming a reaction mixture having a composition comprising $Al_2O_3$, and 4–6 moles of phosphorus source (calculated as $P_2O_5$) per mole of $Al_2O_3$, and sufficient organic templating agent to provide the microporous crystalline aluminophosphate composition in the presence of sufficient water to form a solution, and taking the mixture to an elevated temperature sufficient to form crystals of said aluminophosphate composition.

9. Process for preparing a microporous crystalline aluminophosphate composition of claim 7 wherein the templating agent is tetraethylammonium hydroxide.

10. Process for preparing a microporous crystalline aluminophosphate composition according to claim 7 wherein an additional step comprises mixing $AlPO_4$-5 in a mixture to form $AlPO_4$-34.

11. Crystalline aluminophosphates according to claim 1 having a characteristic X-ray powder diffraction pattern which contains at least the d-spacings set forth in Table A

TABLE A

| 2θ | d (Å) | 100I/Io |
|---|---|---|
| 9.6 | 9.24 | 100 |
| 13.0 | 6.80 | 12 |
| 14.1 | 6.27 | 11 |
| 15.6 | 5.69 | 7 |
| 16.2 | 5.48 | 23 |
| 16.8 | 5.27 | 3 |
| 17.9 | 4.94 | 14 |
| 19.1 | 4.64 | 3 |
| 20.9 | 4.25 | 41 |
| 22.1 | 4.02 | 4 |
| 22.6 | 3.94 | 3 |
| 23.3 | 3.81 | 3 |
| 25.1 | 3.54 | 15 |
| 26.3 | 3.39 | 9 |
| 28.3 | 3.16 | 3 |
| 30.2 | 2.959 | 4 |
| 30.9 | 2.896 | 22 |
| 32.5 | 2.753 | 3 |
| 33.9 | 2.647 | 3 |
| 34.9 | 2.570 | 3 |
| 36.5 | 2.465 | 2 |
| 39.9 | 2.258 | 2 |
| 43.3 | 2.090 | 2 |
| 49.5 | 1.842 | 2 |
| 51.3 | 1.782 | 3. |

12. Crystalline aluminophosphates according to claim 1 having a characteristic X-ray powder diffraction pattern which contains at least the d-spacings set forth in Table B

TABLE B

| 2θ | d (Å) | 100I/Io |
|---|---|---|
| 9.7 | 9.10 | 100 |
| 10.2 | 8.65 | 34 |
| 12.1 | 7.30 | 3 |
| 12.9 | 6.88 | 19 |
| 15.5 | 5.73 | 4 |
| 17.2 | 5.15 | 4 |
| 19.5 | 4.55 | 29 |
| 19.8 | 4.48 | 26 |
| 20.7 | 4.30 | 23 |
| 21.5 | 4.13 | 5 |
| 22.8 | 3.91 | 7 |
| 24.4 | 3.65 | 14 |
| 24.9 | 3.58 | 7 |
| 25.9 | 3.44 | 5 |
| 27.0 | 3.30 | 5 |
| 27.4 | 3.25 | 3 |
| 28.2 | 3.17 | 8 |
| 29.3 | 3.05 | 17 |
| 31.0 | 2.883 | 15 |
| 32.0 | 2.799 | 10 |
| 33.0 | 2.714 | 7 |
| 38.4 | 2.347 | 3 |
| 40.1 | 2.250 | 3 |
| 43.1 | 2.097 | 2 |
| 49.6 | 1.838 | 3 |
| 53.0 | 1.726 | 3. |

13. Crystalline aluminophosphates according to claim 1 having a characteristic X-ray powder diffraction pattern which contains at least the d-spacings set forth in Table C

TABLE C

| 2θ | d (Å) | 100I/Io |
|---|---|---|
| 9.6 | 9.19 | 100 |
| 13.1 | 6.77 | 10 |
| 14.1 | 6.26 | 10 |
| 15.5 | 5.70 | 6 |
| 16.2 | 5.47 | 23 |
| 16.9 | 5.25 | 2 |
| 18.0 | 4.93 | 14 |
| 19.2 | 4.63 | 4 |
| 20.9 | 4.25 | 40 |
| 22.2 | 4.00 | 4 |
| 22.7 | 3.92 | 3 |
| 23.3 | 3.81 | 2 |
| 25.2 | 3.54 | 16 |
| 26.3 | 3.38 | 8 |
| 28.4 | 3.14 | 3 |
| 30.5 | 2.935 | 4 |
| 30.9 | 2.893 | 22 |
| 32.1 | 2.785 | 2 |
| 33.8 | 2.653 | 2 |
| 35.0 | 2.566 | 3 |
| 36.3 | 2.475 | 2 |
| 40.1 | 2.248 | 2 |
| 43.3 | 2.089 | 2 |
| 49.5 | 1.842 | 2 |
| 51.2 | 1.784 | 3. |

14. Crystalline aluminophosphates according to claim 1 having a characteristic X-ray powder diffraction pattern which contains at least the d-spacings set forth in Table D

TABLE D

| 2θ | d (Å) | 100I/Io |
|---|---|---|
| 9.4 | 9.37 | 100 |
| 12.9 | 6.87 | 34 |
| 14.0 | 6.34 | 5 |
| 16.0 | 5.53 | 25 |
| 17.8 | 4.97 | 27 |
| 19.1 | 4.66 | 4 |
| 20.7 | 4.30 | 87 |
| 22.1 | 4.02 | 7 |
| 22.5 | 3.96 | 5 |
| 23.1 | 3.85 | 10 |
| 23.9 | 3.73 | 2 |
| 25.0 | 3.56 | 40 |

TABLE D-continued

| 2θ | d (Å) | 100I/Io |
|---|---|---|
| 26.0 | 3.43 | 33 |
| 27.7 | 3.22 | 7 |
| 28.2 | 3.16 | 5 |
| 29.7 | 3.01 | 5 |
| 30.7 | 2.910 | 74 |
| 31.2 | 2.871 | 39 |
| 32.5 | 2.759 | 4 |
| 33.5 | 2.673 | 6 |
| 34.6 | 2.590 | 16 |
| 36.1 | 2.485 | 13 |
| 38.8 | 2.321 | 3 |
| 39.7 | 2.270 | 62. |

15. Crystalline aluminophosphates according to claim 1 having a characteristic X-ray powder diffraction pattern which contains at least the d-spacings set forth in Table E

TABLE E

| 2θ | d (Å) | 100I/Io |
|---|---|---|
| 9.6 | 9.23 | 100 |
| 13.0 | 6.83 | 10 |
| 14.1 | 6.28 | 11 |
| 16.1 | 5.51 | 18 |
| 16.7 | 5.32 | 5 |
| 18.1 | 4.91 | 14 |
| 20.9 | 4.25 | 48 |
| 23.1 | 3.85 | 4 |
| 25.2 | 3.53 | 11 |
| 26.1 | 3.41 | 11 |
| 28.4 | 3.14 | 3 |
| 30.3 | 2.954 | 9 |
| 30.9 | 2.898 | 16 |
| 43.2 | 2.093 | 3. |

16. Crystalline aluminophosphates according to claim 1 having a characteristic X-ray powder diffraction pattern which contains at least the d-spacings set forth in Table F

TABLE F

| 2θ | d (Å) | 100I/Io |
|---|---|---|
| 9.7 | 9.15 | 100 |
| 13.1 | 6.75 | 8 |
| 14.2 | 6.24 | 11 |
| 16.1 | 5.50 | 15 |
| 18.3 | 4.84 | 16 |
| 21.0 | 4.23 | 35 |
| 23.3 | 3.81 | 3 |
| 25.5 | 3.49 | 11 |
| 26.2 | 3.40 | 10 |
| 28.5 | 3.14 | 2 |
| 30.4 | 2.945 | 7 |
| 30.9 | 2.889 | 16 |
| 32.2 | 2.783 | 3 |
| 33.6 | 2.669 | 2 |
| 34.9 | 2.571 | 3 |
| 40.3 | 2.239 | 3 |
| 49.7 | 1.834 | 2 |
| 51.1 | 1.789 | 2. |

17. Crystalline aluminophosphates according to claim 1 having a characteristic X-ray powder diffraction pattern which contains at least the d-spacings set forth in Table G

TABLE G

| 2θ | d (Å) | 100I/Io |
|---|---|---|
| 9.6 | 9.18 | 100 |
| 13.1 | 6.74 | 5 |
| 14.1 | 6.28 | 10 |
| 16.1 | 5.51 | 14 |
| 18.3 | 4.86 | 16 |
| 20.9 | 4.25 | 26 |
| 22.1 | 4.02 | 2 |
| 22.6 | 3.93 | 3 |
| 23.1 | 3.85 | 3 |
| 25.5 | 3.50 | 11 |
| 26.2 | 3.40 | 6 |
| 28.3 | 3.15 | 2 |
| 30.9 | 2.897 | 16 |
| 32.3 | 2.773 | 4 |
| 34.9 | 2.571 | 2 |
| 40.0 | 2.252 | 2 |
| 49.9 | 1.826 | 3 |
| 51.1 | 1.786 | 2. |

18. Crystalline aluminophosphates according to claim 1 having a characteristic X-ray powder diffraction pattern which contains at least the d-spacings set forth in Table H

TABLE H

| 2θ | d (Å) | 100I/Io |
|---|---|---|
| 9.6 | 9.17 | 100 |
| 13.1 | 6.74 | 4 |
| 14.2 | 6.26 | 9 |
| 16.0 | 5.53 | 10 |
| 18.3 | 4.84 | 16 |
| 20.9 | 4.26 | 22 |
| 22.1 | 4.02 | 3 |
| 23.2 | 3.83 | 3 |
| 25.6 | 3.48 | 11 |
| 28.4 | 3.15 | 2 |
| 30.9 | 2.897 | 14 |
| 32.4 | 2.767 | 4 |
| 34.4 | 2.610 | 2 |
| 40.1 | 2.251 | 2. |

19. Crystalline aluminophosphates according to claim 1 having a characteristic X-ray powder diffraction pattern which contains at least the d-spacings set forth in Table J

TABLE J

| 2θ | d (Å) | 100I/Io |
|---|---|---|
| 9.8 | 9.06 | 100 |
| 13.0 | 6.79 | 17 |
| 14.2 | 6.22 | 15 |
| 16.1 | 5.50 | 12 |
| 21.0 | 4.24 | 28 |
| 25.6 | 3.48 | 9 |
| 30.3 | 2.948 | 6 |
| 31.0 | 2.887 | 21 |
| 35.1 | 2.560 | 4 |
| 36.3 | 2.477 | 2. |

* * * * *